Figure 1:
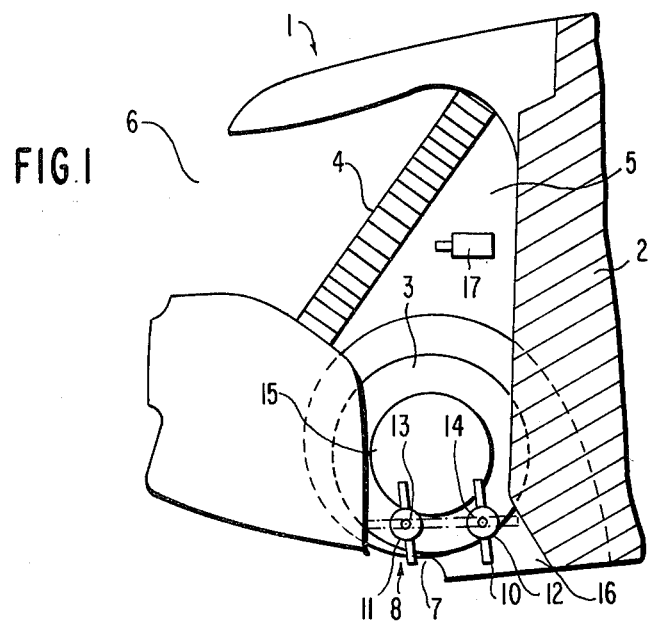

United States Patent [19]

Seifert

[11] 4,438,732
[45] Mar. 27, 1984

[54] COOLING ARRANGEMENT FOR AN INTERNAL COMBUSTION ENGINE

[75] Inventor: Peter R. Seifert, Sindelfingen, Fed. Rep. of Germany

[73] Assignee: Daimler-Benz Aktiengesellschaft, Stuttgart, Fed. Rep. of Germany

[21] Appl. No.: 383,187

[22] Filed: May 28, 1982

[30] Foreign Application Priority Data

May 30, 1981 [DE] Fed. Rep. of Germany ....... 3121650

[51] Int. Cl.³ .............................................. F01P 5/06
[52] U.S. Cl. .............................. 123/41.05; 123/41.12; 180/68.1
[58] Field of Search ............... 123/41.04, 41.05, 41.06, 123/41.11, 41.12, 41.01, 41.58; 165/44; 236/35, 35.2, 35.3; 180/54 A

[56] References Cited

U.S. PATENT DOCUMENTS

| | | | |
|---|---|---|---|
| 2,109,633 | 3/1938 | Cross | 236/35.3 |
| 2,189,888 | 2/1940 | Endsley | 123/41.12 |
| 3,696,730 | 10/1972 | Masuda et al. | 180/54 A |
| 3,777,808 | 12/1973 | Izumi | 236/35.2 |
| 4,189,020 | 2/1980 | Abels et al. | 180/54 A |

Primary Examiner—William A. Cuchlinski, Jr.
Attorney, Agent, or Firm—Craig & Burns

[57] ABSTRACT

A cooling arrangement for an internal combustion engine of a motor vehicle, especially an internal combustion engine enclosed in a sound or noise absorbing shroud. The cooling arrangement includes a cooling air duct having an air intake and an air exhaust, with a radiator being disposed in the cooling air duct, which radiator cooperates with a fan disposed downstream thereof, as viewed in a normal flow direction of the cooling air. To improve the cooling capacity and the operating ranges of dynamic air ventilation, a regulating device is disposed in the air flow at a position downstream of the radiator, with the regulating device being adapted to regulate an air throughflow through the radiator. The regulating device is disposed in a vicinity of the air exhaust of the cooling air duct and the fan is located outside of the cooling air duct and connected to the air duct by a bypass cooling air conduit. The regulating device is adapted to close the air exhaust of the air duct when the fan is switched on or operating.

7 Claims, 2 Drawing Figures

U.S. Patent  Mar. 27, 1984  4,438,732

COOLING ARRANGEMENT FOR AN INTERNAL COMBUSTION ENGINE

The present invention relates to a cooling arrangement and, more particularly, to a cooling device for an internal combustion engine for a passenger motor vehicle, wherein the internal combustion engine and a radiator are enclosed in a noise or sound absorbing shroud, with a cooling air duct forming an air intake and an air exhaust, and with the radiator cooperating with a fan disposed downstream from the radiator as viewed in an air flow direction.

In, for example, Offenlegungsschrift 22 35 183 a cooling device for an internal combustion engine for a motor vehicle is proposed which is not enclosed or surrounded by a sound or noise reducing shroud. The motor vehicle includes a radiator, with a cooling fan being disposed behind the radiator, as viewed in a direction of the air flow, and a control plate for regulating an air throughflow of the radiator. The radiator includes a first area disposed forwardly of the fan, as viewed in a direction of the air flow, and a second area, disposed forwardly of the control plate in the normal air flow direction.

A disadvantage of the above- proposed construction resides in the fact that, in a lower temperature range of the combustion engine, only the first radiator area, supported by the fan, is traversed by the relative wind. The control plate is open and the cooling capacity increased only when operating conditions are reached which necessitate the use of a dynamic air flow to ventilate the second radiator area.

In, for example, Offenlegungsschrift 29 13 648, a construction is proposed wherein a motor vehicle is provided with a shroud, enclosed on all sides and reducing noise for accommodating the engine and/or engine and transmission assembly, with a radiator and a fan disposed behind the radiator, as viewed in a normal flow direction of the air, being disposed outside the noise reducing shroud.

A disadvantage of the last proposed cooling device, as with the cooling device of the aforementioned Offenlegungsschrift 22 35 183, resides in the fact that the fan is also subjected to relative wind which enters the cooling duct even when the required operating conditions would be such that the dynamic pressure or air flow ventilation would be sufficient. This impact of the relative wind on the fan considerably reduces the effect of the ventilation afforded by the dynamic pressure or dynamic air flow.

The aim underlying the present invention essentially resides in providing a cooling device of the aforementioned type which improves the cooling capacity in the operating ranges of dynamic air ventilation.

In accordance with advantageous features of the present invention, a regulating device, of conventional construction, is disposed in the air flow in a direction downstream of the radiator, with the regulating device being adapted to regulate the air throughflow through the radiator. The regulating device is disposed in a vicinity of an air exhaust of an air duct, with the fan being located outside of the air duct and connected with the cooling air duct by a bypass cooling air duct. The regulating device is adapted to close the air exhaust of the cooling air duct when the fan is switched on.

In accordance with further advantageous features of the present invention, the fan is constructed as a radial fan and disposed at right angles to a longitudinal axis of the vehicle and laterally with respect to the air duct. The bypass cooling air duct terminates in a vicinity of the air exhaust above the regulating device in the cooling air duct.

In accordance with still further features of the present invention, the regulating device is formed by regulating plates cooperable with a positioning element, which positioning element is so disposed that it permits closing of the regulating plates only when the operating conditions of the motor vehicle and/or the internal combustion engine exist which require an increased cooling capacity.

The regulating plates are, in accordance with the present invention non-rotatable mounted on shafts, with the shafts being rotatable by servo motors. A positioning element cooperates with the servo motors, with the positioning element being constructed as, for example, a thermostat. The thermostat is adapted to be influenced by, for example, ambient air temperature, the temperature of the engine compartment, or the temperature of the coolant in the coolant circulatory system of the internal combustion engine.

By virtue of the above-noted features of the present invention, a cooling device is provided which permits unimpeded traversing of the radiator and cooling air duct by relative wind when the fan is shut off. At a given cooling capacity, the construction of the present invention permits the use of the radiator with a smaller cooling area during dynamic pressure ventilation, whereby a reduction of the weight of the radiator and coefficient of air resistance ($c_w$) of the vehicle is produced having an advantageous effect upon the fuel consumption of the vehicle.

Furthermore, by locating the fan outside of the cooling air duct, it is possible to utilize the optimum delivery of the fan which is generally not possible when the fan is located inside of the cool air duct by virture of the small structural volume and very narrow angular cooling air channel guide.

Accordingly, it is an object of the present invention to provide a cooling device for an internal combustion engine for a motor vehicle which avoids, by simple means, shortcomings and disadvantages encountered in the prior art.

Another object of the present invention resides in providing a cooling device for an internal combustion engine for a motor vehicle which has an improved cooling capacity.

Yet another object of the present invention resides in providing a cooling device for an internal combustion engine for a motor vehicle which enables the utilization of a radiator having a smaller cooling area.

A further object of the present invention resides in providing a cooling device for an internal combustion engine for a motor vehicle which is simple in construction and therefore relatively inexpensive to manufacture.

Another object of the present invention resides in providing a cooling device for an internal combustion engine for driving a motor vehicle which functions realiable under all operating loads of the internal combustion engine.

Figure 2:
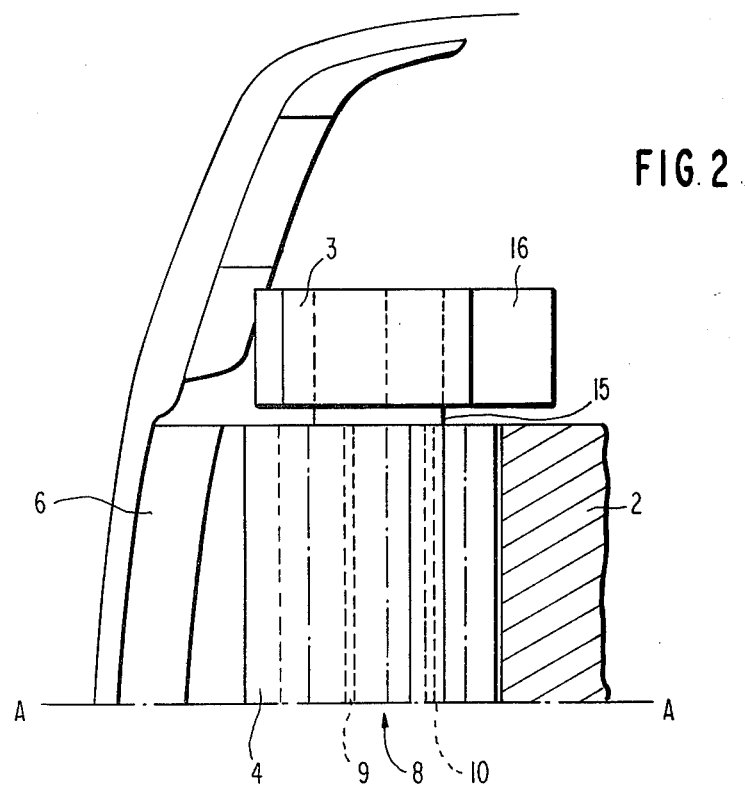

These and other objects, features, and advantages of the present invention will become more apparent from the following description when taken in connection with the accompanying drawing which shows, for the purposes of illustration only, one embodiment in accordance with the present invention, and wherein:

FIG. 1 is a schematic longitudinal cross sectional view through a front portion of a motor vehicle equipped with a sound-absorbant shroud and a cooling device constructed in accordance with the present invention; and FIG. 2 is a partially schematic top view of the front of the motor vehicle of FIG. 1.

Referring now to the drawing wherein like reference numerals are used in both views to designate like parts and, more particularly, to FIG. 1, according to this figure, in a front part of a motor vehicle generally designated by the reference numeral 1, a sound-absorbing shroud is provided for accommodating an internal combustion engine 2, a fan 3, and a radiator 4, with the fan being preferably constructed as a radial fan. A cooling air duct 5 is provided for accommodating the fan 4, with the cooling air duct 5 including an air intake 6 and an air exhaust 7. A regulating device generally designated by the reference numeral 8 is disposed in a vicinity of the air exhaust 7, with the regulating device 8 being adapted to regulate a throughflow cross section of the air exhaust. The regulating device 8 includes, for example, two control plates 9, 10 non-rotatably mounted upon two shafts 13, 14, with the shafts being rotatable by servo motors 11, 12, respectively.

As shown in FIG. 2, the fan 3 is mounted vertically with respect to the longitudinal axis A—A of the vehicle and laterally with respect to the cooling air duct 5, and is connected with the environment through a bypass cooling air duct 15, terminating in the cooling air duct 5 above the regulating device 8, and through an exhaust duct 16. The servo motors 11, 12 cooperate with a positioning element 17 which may, for example, be constructed as a thermostat. The positioning element 17 is adapted to be influenced by, for example, outside air temperature, a temperature of the engine compartment, or a temperature of the coolant of a coolant system of the internal combustion engine 1.

In the operating ranges of the internal combustion engine, in which no especially high cooling capacity is required, the regulating plates 9, 10 assume the position illustrated in solid lines in FIG. 1, in which the air exhaust 7 of the cooling duct 5 is opened. The fan 3 is switched off and the cooling air produced by the relative wind enters through the air intake 6 into the cooling air duct 5, passes through the radiator 4, and emerges or is discharged from the cooling air duct 5 through the air exhaust 7.

In operating ranges of the internal combustion engine wherein higher cooling capacity is required, the regulating plates 9, 10, controlled by the positioning element 17, i.e., a thermostat, are rotated by the servo motors 11, 12 into the position illustrated in phantom lines in FIG. 1, wherein the air exhaust 7 is closed and the fan is turned on. The cooling air entering the cooling air duct 5 through the air intake 6 passes through the radiator and is drawn out of the cooling air duct 5 through the bypass cooling air duct 15 by the fan 3 and the vented into the environment through the exhaust duct 16.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A cooling arrangement for a motor vehicle internal combustion engine accommodated in a sound-absorbing shroud, the cooling arrangement including a cooling air duct means having an air intake and air exhaust, a radiator means disposed in the air duct means, and a fan means cooperable with the radiator means and disposed at a position downstream of the radiator means, as viewed in a normal flow direction of cooling air, characterized in that means are provided for regulating an air throughflow through the radiator means, the means for regulating are disposed downstream of the radiator means, as viewed in the normal flow direction of cooling air, in an area of the air exhaust of the air duct means, the fan means is disposed exteriorly of the air duct means, means are provided for communicating the fan means with the air duct means, and in that means are provided for controlling an operation of the fan means and a position of the means for regulating such that the means for regulating closes the air exhaust when the fan means is operable.

2. A cooling arrangement according to claim 1, characterized in that the fan means is adapted to be disposed at a right angle to a longitudinal axis of the motor vehicle and laterally of the air duct means, and in that the means for communicating terminates in the air duct means in a vicinity of the air exhaust at a position above the means for regulating.

3. A cooling arrangement according to claim 2, characterized in that the fan means is a radial fan, the means for communicating include a bypass cooling duct means.

4. A cooling arrangement according to one of claims 1, 2, or 3, characterized in that the means for regulating includes at least one regulating plate, the means for controlling includes a positioning means for permitting a closing of the at least one regulating plate only when operating conditions of at least one of the motor vehicle and internal combustion engine exist requiring an increased cooling capacity.

5. A cooling arrangement according to claim 4, characterized in that the positioning means includes at least one rotatably mounted shaft means having the regulating plate disposed thereon for rotation therewith, servo means for rotating the shaft means, and a thermostat means operably connected with the fan means and the servo means for controlling an operation of the fan means and servo means in dependence upon at least one of an ambient air temperature, engine compartment temperature, and temperature of an engine coolant.

6. A cooling arrangement according to one of claims 1, 2, or 3, characterized in that the means for regulating includes at least two regulating plates, the means for controlling includes a positioning means for permitting the closing of the at least two regulating plates only when operating conditions of at least one of the motor vehicle and internal combustion engine exist requiring an increased cooling capacity.

7. A cooling arrangement according to claim 6, characterized in that the positioning means includes at least two rotatably mounted shaft means, each of the shaft means having disposed thereon one of the regulating plates for rotation therewith, a servo means provided for each of the shaft means for rotating the respective shaft means, and a thermostat means operably connected with the fan means and the servo means for controlling an operation of the fan means and servo means in dependence upon at least one ambient air temperature, engine compartment temperature, and temperature of an engine coolant.

* * * * *